P. MOODIE.
LOCK NUT.
APPLICATION FILED FEB. 9, 1911.
Reissued Oct. 31, 1911.
13,303.
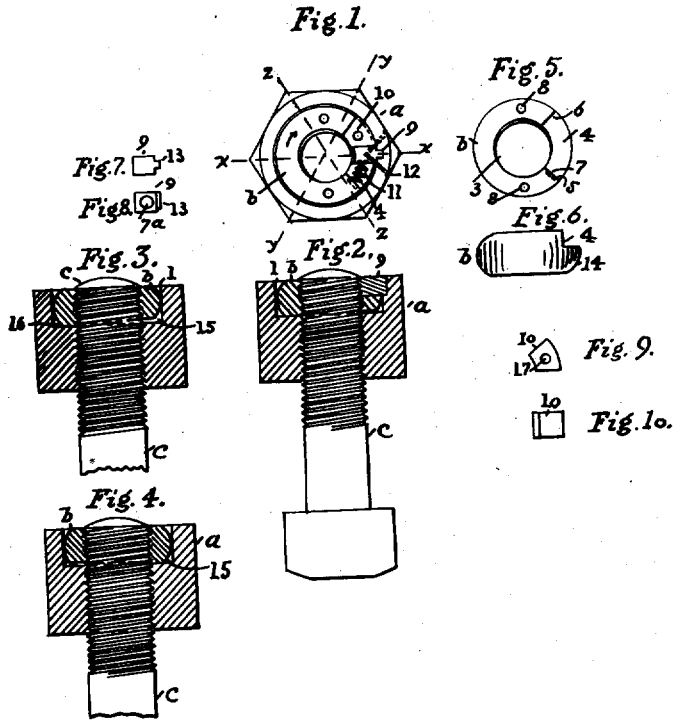
Attest.
John A. Martin.
L. A. Hill.
Inventor;
Peter Moodie
by Lewis Willis Pierce
attorney
COLUMBIA PLANOGRAPH CO., WASHINGTON, D. C.

UNITED STATES PATENT OFFICE.

PETER MOODIE, OF MALDEN, MASSACHUSETTS.

LOCK-NUT.

13,303. Specification of Reissued Letters Patent. Reissued Oct. 31, 1911.

Original No. 926,504, dated June 29, 1909, Serial No. 491,900. Application for reissue filed February 9, 1911. Serial No. 607,715.

*To all whom it may concern:*

Be it known that I, PETER MOODIE, residing at Malden, in the county of Middlesex and State of Massachusetts, have invented certain Improvements in Lock-Nuts, of which the following is a specification.

The invention about to be described relates to safety lock nuts whereby bolts employed in structures which are subjected to great vibrations, such as railroad rails, bridges, etc., may be held firmly in position.

The invention consists in a nut having in its upper portion a cavity in which is located a supplementary nut, or a locking device, adapted to engage the thread of the bolt, and also to become locked to the bolt and nut in such a manner that while the nut may be turned toward the head of the bolt it cannot be turned in the opposite direction until it is manually unlocked, and if for any cause the nut should turn slightly in the direction of the head of the bolt the locking mechanism will follow so that there will never be lost motion. All of which I will now proceed to describe and point out in particular in the appended claims, reference being had to the accompanying drawings in which—

Figure 1 is a top view of the nut; Fig. 2 is a section on line *x x* of Fig. 1; Fig. 3 is a section on line *z z* of Fig. 1; Fig. 4 is a section on line *y y* of Fig. 1; Figs. 5 and 6 are top and side views of a detached portion; Figs. 7 and 8 are top and side views of another detached portion; and Figs. 9 and 10 are top and side views of a third detached portion.

In the drawings *a* represents a nut interiorly threaded as is usual, having a circular cavity 1 in its upper portion whose bottom or floor 16 is at right angles to the axis of the nut; and *b* is an interiorly threaded ring fitting into the cavity 1, but slightly smaller in diameter than that of the cavity, and has its peripheral edge rounded and has a section 4 cut out for about one-quarter of its circumference and for about one-half of its depth, forming two abutments 5 and 6, the former of which has a depression 7, in its face, and two holes, 8 8, on opposite sides of its upper face. The under side of the ring *b* is inclined to the axial line of the internal screw-thread, *i. e.*, it is of less thickness on one side than on the other; its surface is, however, level and adapted to bear upon the floor 16 of the cavity, as will be explained. The screw-thread of the ring *b* bears looser upon the bolt *c* than does the thread of the nut *a* because it is thinner than the nut and there not being so many threads.

The ring *b* is placed in the cavity and then an inward radial block 9 is secured in the edge of the nut and held in place by screws or rivets 12, there being a cut made in the said edge into which enters the projection or tenon 13 of the block; one face of the block 9 has a depression $7^a$, in which rests the end of the spring 11, whose opposite end is engaged by the depression 7 in the ring abutment 5; the spring is of sufficient strength to force the ring around so that the side of the block can touch, or nearly so, the abutment 6. When the nut is not in use I prefer to compress the spring 11 by inserting a block 10 between the block 9 and the abutment 6, as this keeps the parts together and permits the use of the nut without the operation of the locking part.

When the nut is screwed upon the bolt *c* for use and its bearing portion brought hard down, and it is desired to lock the same to the bolt, the block 10 is removed by inserting some tool into the hole 17 and lifting it out, whereupon the spring 11 forces the ring around in the direction of the arrow and as it descends on the thread of the bolt it tilts over, owing to its being somewhat loose upon the thread, so that its under cam-like surface comes to the floor of the cavity and wedges between the same and the under side of the screw-threads on which it moves and binds itself tightly to the bolt and forms a lock which cannot be unfastened, so that if a wrench is applied to the nut *a* it cannot be turned upward on the bolt. The lock of the ring to the bolt and nut can only be broken by the insertion of a spanner wrench into the holes 8 8 of the ring and the latter turned back to compress the spring 11, thus rotating the ring on the threads upwardly, when if a wrench be applied to the nut it can then be removed from the bolt.

The line *z z* on Fig. 1 may indicate the axial line across the greatest and least thickness of the ring when the block 10 is in place, and the line *y y* the said axial line when the block is removed and the ring rotated as stated. These lines are somewhat exaggerated as to circumferential distance in order to more clearly illustrate the operation.

I claim as my invention:—

1. A screw nut provided with a cavity in its upper part having a radial abutment, an internally screw-threaded locking device within the cavity whose under surface is inclined to its axial line, in resilient relation to the said abutment, the nut and the device adapted to traverse the thread of a bolt whereby the locking device is adapted to be wedged between the nut and the screw-threads of a bolt.

2. A screw-nut having a cavity in its upper part of larger diameter than that of the screw-thread with an inward radial block from the edge of the nut, a locking device in the cavity having a section cut away, and a spring between the same and the said block, its bottom having a cam surface.

3. A screw-nut provided with a cavity in its upper part of larger diameter than that of the screw-thread with an inward radial block extending from the edge of the nut, a locking device in the cavity having a section cut away to provide two abutments, a spring between one of said abutments and one side of the block, and a key piece between the other abutment and the said block.

4. A screw-nut having a circular cavity in its upper part with an inward abutment from its edge, a circular locking device adapted to rotate freely within the cavity having a section cut away and its under surface inclined toward the axial line, with a spiral spring between said abutment and said section, as and for the purpose set forth.

5. A device of the character described, comprising two members having threaded apertures in alinement to engage a bolt and relatively rotatable to bind on or release the bolt according to the positions of said members relatively to each other, and means for causing said members to automatically assume their relative positions for binding after being turned to desired position on the bolt.

6. A device of the character described, comprising two members having threaded apertures in alinement to engage a bolt and relatively rotatable to bind or release the bolt according to the positions of said members relatively to each other, and means whereby turning one member in one direction will cause the other member to turn in the same direction.

7. A device of the character described, comprising two members having threaded apertures in alinement to engage a bolt and relatively rotatable to bind on or release the bolt according to the positions of said members relatively to each other, one of said members having a recess receiving and guarding the other member, and means for automatically causing said members to assume their relative positions for binding after being turned to desired position on the bolt.

In testimony whereof, I have signed my name to this specification in the presence of two subscribing witnesses, this sixth day of February, A. D. 1911.

PETER MOODIE.

Witnesses:
GEO. WILLIS PIERCE,
JOSEPH A. GATELY.

Copies of this patent may be obtained for five cents each, by addressing the "Commissioner of Patents, Washington, D. C."